July 20, 1965

L. A. WILLIAMS 3,196,093

ELECTROLYTIC CAVITY SINKING APPARATUS AND METHOD
FOR NON-PARALLEL WORKPIECE SURFACES

Filed June 13, 1960

INVENTOR:
Lynn A. Williams
BY
Wupper, Gradolph & Love
Attys

United States Patent Office 3,196,093
Patented July 20, 1965

3,196,093
ELECTROLYTIC CAVITY SINKING APPARATUS AND METHOD FOR NON-PARALLEL WORKPIECE SURFACES
Lynn A. Williams, Winnetka, Ill., assignor to Anocut Engineering Company, Chicago, Ill., a corporation of Illinois
Filed June 13, 1960, Ser. No. 35,647
10 Claims. (Cl. 204—143)

The present invention relates generally to electrolytic cavity sinking apparatus and method of the type disclosed in the copending application of Lynn A. Williams, Serial No. 772,960, filed November 10, 1958, for "Electrolytic Shaping," issued into Patent No. 3,058,895, dated October 16, 1962, and Lynn A. Williams and James E. Davis, Serial No. 863,246, filed December 31, 1959, for "Control and Operating System for Electrolytic Hole Sinking." This invention is more particularly concerned with facilitating the entry of the electrode into the workpiece when the axis of the electrode is not normal to the surface of the workpiece due to the angular disposition of such surface or to the fact that it may be contoured.

In general, apparatus of the type disclosed in the foregoing applications includes a fixture for securely mounting the workpiece, a hollow electrode having a working tip of electrically conductive material, a ram head mounting the electrode for movement relative to the workpiece, an electric power supply connected to the electrode and to the workpiece so as to make the workpiece anodic and the electrode cathodic and capable of delivering a low voltage, high density direct current, and a source of electrolyte capable of delivering electrolyte at a high velocity in the work gap and at a pressure of about 150 to 200 pounds per square inch.

From time to time, it is desired to pass the electrode for making a hole in or through the workpiece in a direction oblique to the surface where the hole is to enter the work. It is, of course, possible to miter the tip of the electrode to match the slope of the surface to be entered, but this is a factor that complicates the fabrication of the electrode. It is a serious factor where the shape of the hole or cavity is other than round or a simple geometric figure. Mitering the tip of the electrode in this fashion cannot be done when the bottom of the cavity is to be contoured.

It is also possible that the surface where the hole is to enter is oblique with respect to the axis of the hole while the existing side may be normal to the axis of the hole. In such a case, if the working tip of the electrode is aligned with the entering face, then problems are encountered in producing a proper and clean breakthrough at the existing face.

It has been found that when a simple tubular electrode with its working tip normal to the electrode axis is intended to produce a round hole in a workpiece where the entry surface is oblique with respect to the axis of the electrode there is trouble in making entry into the work. The electrolyte which flows down the electrode or toward its outlet tends to escape in a more or less angularly outward direction across the surface sloping away from the electrode. It is probable that there will not be sufficient electrolyte flowing between the tip of the electrode and the point where it makes its first contact with the workpiece so as to assure that electrolysis will occur. Unless the feed rate is extremely slow (and even this will not assure good results) what happens is that the lower limb of the electrode makes touching contact with the workpiece causing an arc which damages both the work and the electrode.

While this analysis is made primarily with respect to plane obliquely disposed entering surfaces, the same problems exist with respect to curved and contoured entering surfaces.

It is, therefore, a principal object of the present invention to provide a new and improved electrolytic cavity sinking apparatus and method utilizing an electrode with its working tip normal to the axis of the electrode wherein entry of the electrode into a workpiece with an entry surface other than normal to the axis of the electrode is facilitated.

Another object is to provide a new and improved electrolytic cavity sinking apparatus wherein the electrode approaches the entry surface of the workpiece through a closely circumscribing enclosure to prevent the undesired and uncontrolled escape of electrolyte from the work gap.

Another object is to provide a new and improved electrolytic cavity sinking apparatus including an electrode guide having sealing contact with the entry surface of the workpiece surrounding the point of anticipated entry of the electrode into the work.

Another object is to provide a new and improved electrolytic cavity sinking apparatus including an arrangement for closely guiding the electrode against the entry surface of the workpiece and to prevent uncontrolled escape of electrolyte.

Another object is to provide a new and improved electrolytic cavity sinking apparatus including a guide for the electrode having means to prevent vibration of the electrode.

Another object is to provide a new and improved electrolytic cavity sinking apparatus having means at the exit side of the workpiece to direct all of the electrolyte back past the working tip of the electrode to produce a smooth exit with no sharp edges or inturned lip.

Another object is to provide a new and improved electrolytic cavity sinking method wherein the electrode is advanced toward and into the workpiece through a closely circumscribing guide which seals against the entry surface of the workpiece to prevent escape of electrolyte.

Another object is to provide a new and improved electrolytic cavity sinking method wherein the electrode is guided and restrained against lateral vibration without impeding its longitudinal or axial movement.

Another object is to provide a new and improved electrolytic cavity sinking method wherein the electrolyte flow between the electrode tip and the entry surface of the workpiece is fully controlled to insure electrolysis regardless of the disposition of the entry surface relative to the axis of the electrode.

Other objects and advantages will become apparent from the following description taken in conjunction with the accompanying drawing wherein.

Figure 1:
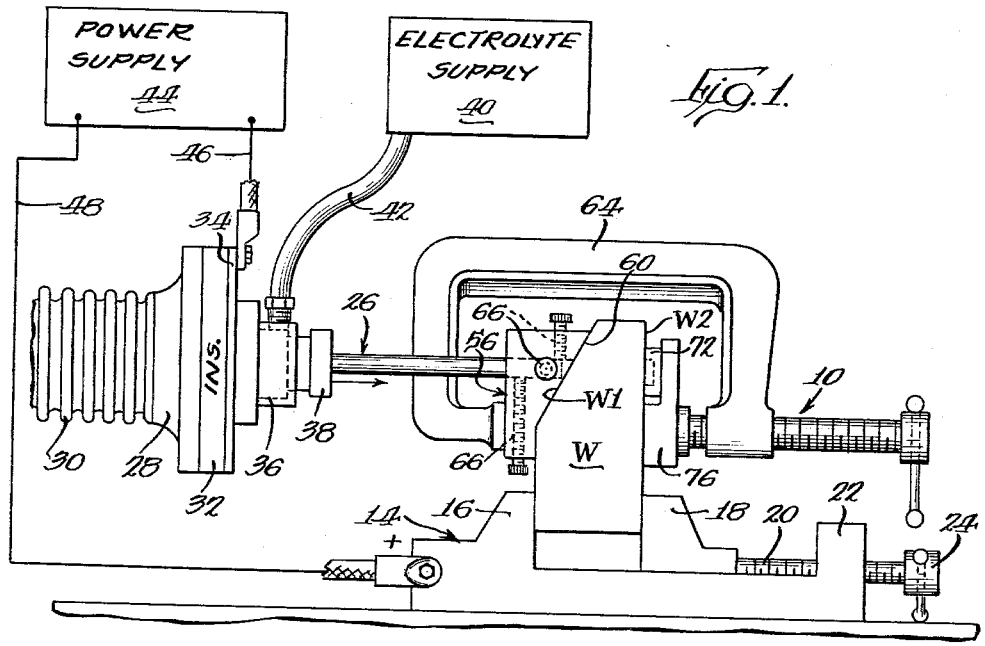
FIG. 1 is a partially schematic elevational view of the essential elements of an electrolytic cavity sinking apparatus incorporating the present invention.

In the drawing there is shown in FIG. 1 a schematic representation of those parts of an electrolytic cavity sinking machine or apparatus indicated generally by the reference character 10 as would be necessary to an understanding of the invention herein. Such apparatus is more completely disclosed in the aforementioned patent applications Serial Nos. 772,960 and 863,246. It includes a machine base or table on which is mounted a fixture 14 for holding a conductive workpiece W. The fixture shown is in the form of a vise having a stationary abutment 16 and a movable abutment 18, which are moved toward and away from each other by a conventional screw 20 operating through a block 22 by means of a turning handle 24.

A hollow electrode indicated generally by the numeral 26, which will be described in greater detail hereinafter, is mounted for movement at a constant speed relative to the workpiece W and has a cross sectional area contoured to the cross sectional configuration of the hole or bore to be formed in or through the workpiece. The electrode in the particular arrangement shown is movable and is driven by a ram 28 powered from a positively driven screw (not shown). A collapsible boot 30 is connected to the inner end of the ram and surrounds some of the working parts of the apparatus to protect them against the corrosive action of the electrolyte. On the forward face of the ram 28 is mounted a block 32 of insulating material to which is fixed a metal plate 34 and an electrode holder 36, the latter being mounted to the plate 34 by suitable screws or bolts. A suitable fitting 38 carried at the inner end of the electrode 26 is used to mount the electrode to the holder 36.

The electrolyte is fed to the holder 36, the fitting 38 and the electrode 26 from an electrolyte source 40 through a flexible conduit or hose 42. The electrolyte source includes a tank containing a supply of electrolyte and a pump capable of delivering the electrolyte from the tank through the conduit and at the interface between the electrode and the workpiece at a high pressure, for example, 150 to 200 p.s.i. and at an extremely high velocity in the work gap.

The electrode 26 may be formed in a variety of ways, as for example shown in application Serial No. 772,960 or in the copending applications of Lynn A. Williams, Serial No. 800,276, filed March 18, 1959, and entitled "Electrode for Electrolytic Hole Sinking," now abandoned; Serial No. 849,595, filed October 29, 1959, and entitled "Electrode for Electrolytic Shaping," issued into Patent No. 3,019,178, dated January 30, 1962, and Serial No. 853,194, filed November 16, 1959, and entitled "Electrolyzing Electrode," now Patent No. 3,120,482, dated Feb. 4, 1964. As will be explained hereinafter, the electrode is hollow or has one or more electrolyte conveying passages therethrough, has an exposed conductive metallic tip, and its outer surface is covered with a thin layer of an insulating material such as an epoxy paint or resin or a tube of Teflon resin. The electrode is made cathodic or negative with respect to the workpiece by a power supply 44 which is capable of delivering a low voltage, high density direct current, for example, in the ranges of 5 to 15 volts and 500 to 8,000 amperes per square inch of workpiece area under electrolytic action. It has been found that the common effective working ranges are 9 to 11 volts and 1500 to 3000 amperes per square inch. The power supply is connected through low resistance cables 46 and 48 to the plate 34 and the workpiece W respectively.

Figure 2:
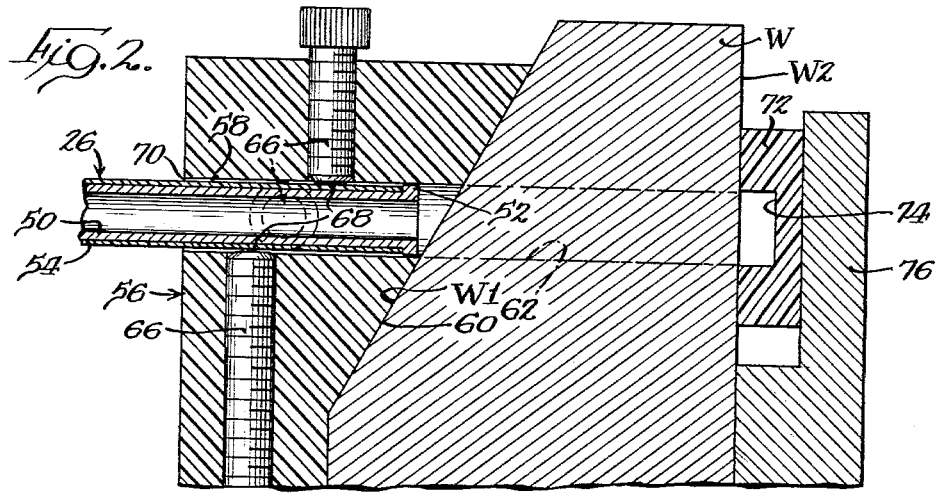
FIG. 2 is a greatly enlarged sectional view showing the workpiece, electrode, guide and other related elements.

In FIG. 2 the workpiece W and the electrode 26 are shown in greatly enlarged sectional detail. It will be noted that entry face W1 of the electrode is oblique to the axis and line of movement of the electrode, thus presenting a problem in the entry of the electrode into the workpiece unless the working tip of the electrode be mitered. For reasons which were previously explained, this is undesirable. It should be noted that the problems sought to be overcome by this invention are present even though the entry surface W1 of the workpiece be normal to the path of movement of the electrode 26. The electrode tip may be contoured to provide a particular contoured bottom in the cavity being formed; or the exit surface of the workpiece might be oblique to the path of movement of the electrode and it could be desirable that the electrode tip be mitered and thus present entry problems. The electrode 26 shown is a conductive tube 50 of small outer diameter and small bore and may be made of copper or a similar good electrically conductive material. At its outer end the tube is formed with an outwardly turned flange 52 to provide the working tip or working face, and behind the tip the surface of the tube 50 is covered with insulation 54 which may be a Teflon resin tube or a coating of an epoxy resin. This tip is normal to the axis of the tube 50 and therefore at an angle, for example, about 30°, with respect to the entry face W1 of the workpiece W. Consequently, when electrolyte flows through the electrode tube, the normal tendency for it is to spray upwardly along the face of the workpiece and away from the electrode, thus starving the work gap for electrolyzing electrolyte. It is probable, therefore, that as the electrode approaches the workpiece, there will not be sufficient electrolyte flowing down between its working tip and the point of its first contact with the surface W1 to assure that electrolysis will occur. Under these circumstances there would be a metal to metal contact causing arcing between the electrode and the workpiece and damage to both.

It will be observed from FIG. 2 that the electrode is advanced through an insulating guide block 56 made of a material which not only is electrically insulating but is not subject to attack by the electrolytes customarily used in electrolytic cavity sinking. A suitable material is an epoxy resin. The guide block has an opening 58 formed therein of the same cross sectional configuration as the cross sectional configuration of the electrode 26. The opening 58, however, is slightly larger than the lip or flange 52 to provide a clearance therebetween in the order of .002 inch to .004 inch. Ordinarily if the opening 58 is round, it may be formed by drilling the guide block. If it is of another shape, particularly of a difficult configuration properly to machine, the opening 58 may be formed by casting the block 56 with the appropriately shaped hole therein. The block also is formed with a sealing face 60 having a contour complemental to that of the entry surface W1, particularly in the area where the bore or hole 62 is to be formed in the workpiece. These surfaces 60 and W1, when the guide block 56 is clamped in place, seal against each other to prevent leakage of electrolyte between the guide and the workpiece.

To insure proper mounting of the guide it is secured in place by a suitable clamp 64, shown in FIG. 1 as a conventional C clamp. However, it might be desirable to find some more rapid way of affixing the clamp 64 in place than is accomplished by means of the customary C clamp which has a screw operated movable clamping member. Furthermore, if a very large number of pieces of similar configuration were to be machined, it might be desirable to mount the guide block on pins so that it would be urged forwardly along the pins and against the face of the workpiece. The workpiece would then be pushed up against the guide block 56, and when clamped as with the movable member 18 of the fixture 14, this would bring sufficient pressure of the workpiece against the guide block to accomplish the necessary sealing.

With the electrode 26, the workpiece, W, and guide 56 in the relative positions shown in FIG. 2 the power is turned on and electrolyte is fed at a high pressure and with a high velocity at the work gap. It flows rapidly from the exit end of tube 50 and completely fills the space around the tip 52 of the electrode and the entry surface W1 of the workpiece. As the metal of the electrode approaches the surface W1 under the forward motion of the ram 28, electrolysis immediately begins at the lower limb of the electrode and gradually extends across the entire working tip. The electrolyte flows out through the end of the electrode 26, past its slightly flaring tip 52 and back along its outer surface in the very small clearance space between the insulating covering 54 on the electrode tube 50 and the interior of the guide hole 58. There is no wastage of electrolyte in the work gap and the entry of the electrode into the workpiece is easily and positively made.

Should the entry surface W1 be concave, convex or be otherwise contoured, the mating surface 60 of the guide block would be made to conform to such shape to provide a proper seal between the two when clamping pressure is applied.

Experience has taught that many types of electrodes, particularly long electrodes, have a tendency to vibrate as a result of the flow of electrolyte under considerable pressure and with the velocity desired for efficient electrolytic cavity sinking. This is disadvantageous as the lateral motion of the electrode relative to the workpiece may cause short circuiting between the working tip 52 and the workpiece surface W1. This lateral vibration as been reduced, if not eliminated, by the provision of guide means in the guide block 56. These guide means take the form of pins 66 shown as screws threaded into suitably tapped apertures in the guide block 56 and protruding slightly into the guide opening 58. The pins 66 do not have a tight fit against the electrode 26, but provide a slight measure of clearance between their tips 68 and the maximum diameter or maximum dimension of the tip 52 of the electrode 26 if it be an electrode with a flaring tip or working end, or between the guide end 68 and the insulating covering 54 on the electrode. It is preferred that there be an adequate number of these guide members 66 projecting into the guide opening 58 in the guide block to inhibit the lateral vibration of the electrode, but it will be noted that they are staggered longitudinally of the electrode so as not in any way to impede the reverse flow of the electrolyte from the working face to the entry end 70 of the guide opening 58.

With reference particularly to FIG. 2, it will be noted that there is positioned at the exit surface W2 of the workpiece a backup cup 72 having a cavity 74 formed therein which is appreciably larger in diametric configuration than the intended hole 62 and is of reasonable depth.

Figure 3:
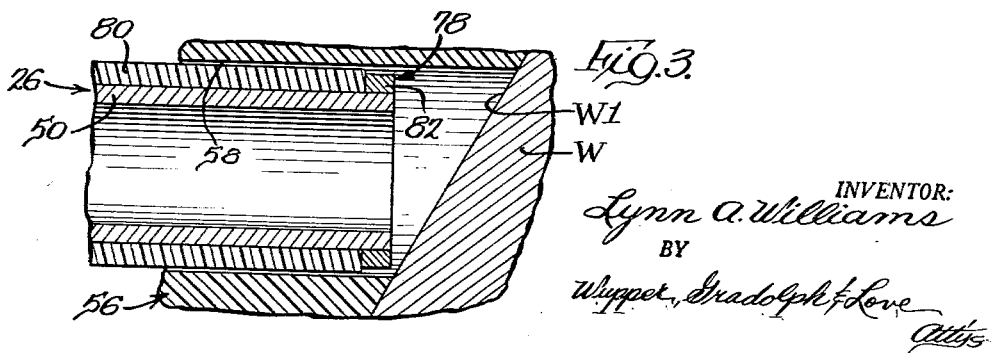
FIG. 3 is a view similar to FIG. 2 showing a modified form of electrode.

The cup 72 is formed of a material similar to or identical with the guide block 86 and therefore may be formed of an epoxy resin. It is held in position by an auxiliary clamp 76 which is secured against the rear face of the workpiece by the main guide block clamp 64. The function of the backup cup 72 is to permit the electrode 26 to pass entirely through the workpiece W while still causing the electrolyte to exit back through the cavity 62 made in the workpiece and back through the opening 58 in the guide block 56. This means that all of the electrolyte must be turned past the working tip 52 of the electrode even after it has begun to break through the exit surface W2 of the workpiece. In this way a smooth exit can be accomplished without leaving any sharp edges or inturned lip. Sometimes it will be desirable when using the backup cup 72 to terminate the cavity sinking operation at the point where the electrode 26 has broken through the exit surface W2 all the way around as with many electrodes, particularly of relatively large areas with a single or few bores for electrolyte transmission, there will be a slug or core of work material released into the backup cup. The slug or core of the work material is removed so that it will not rattle around and be the cause of occasional short circuits or mechanical damage to the electrode and to prevent any short circuiting against the exit face W2 of the workpiece. In these circumstances when the operation is temporarily halted, the clamp 64 is released, the backup cup 72 is removed, the exit slug cleared from the cavity 74, and the backup cup replaced. The advance of the electrode is then continued until the working tip is cleanly passed entirely through the workpiece W thus producing uniformity of size in the cavity 62 and a clean exit at the face W2.

Where lateral vibration of the electrode 26 is a serious problem, as in the making of long holes 62, which necessitates the use of long electrode 26, it may be minimized by making the working tip slightly, but only slightly, smaller than the outer surface of the insulating sleeve 54 (FIG. 3). The difference in diameter between the working tip and the sleeve may be in the order of about .001 inch to .003 inch. In this case the guide block 56 is sized with respect to the insulating sleeve 54 or the electrode 26 rather than with respect to the working tip as was the case with the form shown in FIG. 2. The electrode tube 50 may be made of copper tubing, and in a typical case the copper tubing has an outside diameter of .060 inch and an internal bore for the passage of the electrolyte of about .025 inch. The side walls are insulated with Teflon tubing 80 having a normal wall thickness of .005 inch. The tubing 80 is chosen to fit very snugly so that it actually has to be expanded somewhat in order to slide it onto the copper tubing 50. The result of this is to stretch the Teflon insulation tubing 80 so that the wall thickness is reduced by 10 or 20% so that it is perhaps .004 inch thick after it has been put in place as compared with the wall thickness of .005 inch prior to positioning. In order to assure that the tubing 80 will not under any conditions slide backwardly along the copper tube 50, it is cemented at least near the working tip with an epoxy cement. In order to accomplish this, it is first necessary to etch the Teflon tubing by use of a commercial etchant which are known in the art. It is desirable also to roughen the surface of the copper tube 50 to aid in forming a good adhesive bond.

At the working tip 78 a tiny bushing 82 is fastened to the end of the copper tube 50 by means of soldering. The bushing 82 may have a thickness in the axial direction of about .015 inch to .030 inch and its wall thickness is about .002 inch to .003 inch so that its maximum outside diameter is slightly smaller than the outside diameter of the Teflon insulating tube 80 when in place. The purpose of this arrangement is to use the Teflon insulating sleeve 80 as a means of preventing contact between the tip 82 and the side wall of the workpiece W even when the electrode vibrates. The electrode tip bushing 82 may be made of a material which is specially resistant to damage from accidental short circuiting; for example, it may be made of tungsten or tantalum, or a mixture of silver and tungsten.

When the electrode 26 shown in FIG. 3 is used, the opening 58 in the guide block is sized to leave a clearance space in the order of .002 inch to .004 inch with respect to the Teflon insulating sleeve 80 around the electrode 26 for the passage of electrolyte outwardly from the interface between the electrode tip 78 and the workpiece W.

In summary, it should be appreciated that the guide block 56 prevents the free exit of electrolyte from the open end of the electrode 26 as it first approaches the contoured or oblique entry surface W1 of the workpiece. This forces the exiting electrolyte to return between the working tip and the surface of the work material at the point of first approach, and this continues to be effective in an electrolyzing action between the electrode and workpiece until such time as the electrode has had its tip completely embedded in the workpiece. When this occurs, the bottom surface of the cavity which is being formed is normal to the axis of the advance of the electrode so that the work continues as it would if the entry into the workpiece had been made against a surface normal to the path of advance. In addition it should be noted that the guide block 56, particularly when equipped with the guiding elements 66, performs the functions of giving guidance in location of the electrode and of minimizing the likelihood of lateral vibration without seriously impeding the exit of electrolyte as would be the case if the guide block were to fit snugly about the electrode at any axial position.

It will thus be observed that the advantages which were claimed for this invention at the outset of this specification have been fully attained.

While preferred embodiments of a new and improved electrolytic cavity sinking apparatus constituting the present invention have been shown and described, it will be apparent that numerous modifications and variations may be made therein without departing from the underlying principles of the invention. It is, therefore, intended by the following claims to include all such variations and modifications by which substantially the results of this invention may be obtained through the use of the same or equivalent means.

What is claimed as new and desired to be secured by United States Letters Patent is:

1. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the combination therewith of an electrode guide clamped against the entry surface of the workpiece and being made of a substantially incompressible electrically nonconductive, corrosion-resistant material, said guide having means sealing against the entry surface of the workpiece in the area surrounding the entrance to the cavity to be formed in the workpiece, an opening through said guide and through which the electrode is adapted to pass, said opening having the same cross sectional shape as the electrode and providing a very close clearance space between the electrode and the inner surface of said guide opening and which is open to the atmosphere at the point remote from said means sealing against the entry surface of the workpiece to provide a limiting flow exit path for electrolyte flowing from the work gap thus to insure that the space between the electrode working face and the entry surface of the workpiece is filled with electrolyte, and a plurality of lateral guide members adjustably held by said guide and projecting into said opening and lightly guiding the electrode against lateral vibration.

2. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the combination comprising, an electrode guide block made of a substantially incompressible electrically nonconductive, corrosion resistant material having a guide surface adapted to lie against the entry surface of the workpiece and complementally formed therewith so as to seal thereagainst, an opening through said guide block and through which the electrode is adapted to pass, said opening having the same cross sectional shape as the electrode and providing a very close clearance space between the electrode and the inner surface of said guide opening and which is open to the atmosphere remote from said guide surface sealing against the entry surface of the workpiece to provide a limiting flow exit path for electrolyte flowing from the work gap thus to insure that the space between the electrode working face and the entry surface of the workpiece is filled with electrolyte, and means removably clamping said electrode guide block against the workpiece to facilitate entry of the electrode into a workpiece the entry surface of which is other than parallel to the active face of the electrode tip.

3. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the combination comprising, an electrode guide block made of a substantially incompressible electrically nonconductive, corrosion resistant material having a guide surface adapted to lie against the entry surface of the workpiece and complementally formed therewith so as to seal thereagainst, an opening through said guide block and through which the electrode is adapted to pass, said opening having the same cross sectional shape as the electrode and providing a very close clearance space between the electrode and the inner surface of said guide opening, a backup cup of nonconductive, corrosion resistant material having an inwardly facing cavity lying against the exit surface of the workpiece, said cavity of said cup being aligned with said electrode guide opening, and means removably clamping said electrode guide block and said cup against the workpiece to facilitate entry of the electrode into a workpiece the entry surface of which is other than parallel to the active face of the electrode tip and to insure return of electrolyte from the electrode tip along the outer surface of the electrode and through the hole formed in the workpiece and said guide block opening.

4. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the improvement comprising, an electrode guide adapted to be clamped against the entry surface of the workpiece, said guide comprising a substantially rigid block of an electrically nonconductive, corrosion resistant material and having a guide surface adapted to seal against the entry surface of the workpiece in the area of the cavity to be formed therein, an opening through said guide block and through which the electrode is adapted to pass, said opening having the same cross sectional shape as the electrode and providing a very close clearance space between the electrode and the inner surface of said guide opening and which is open to the atmosphere at the point remote from said guide surface sealing against the entry surface of the workpiece to provide a limiting flow exit path for electrolyte flowing from the work gap thus to insure that the space between the electrode working face and the entry surface of the workpiece is filled with electrolyte, and a plurality of axially offset lateral guide members adjustably held by said guide block and projecting into said opening and adapted lightly to guide the electrode against lateral vibration.

5. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the improvement comprising, an electrode guide adapted to be clamped against the entry surface of the workpiece, said guide comprising a substantially rigid block made of an electrically nonconductive, corrosion resistant material and having a surface adapted to lie against the entry surface of the workpiece and complementally formed therewith to seal thereagainst, an opening through said guide block and through which the electrode is adapted to pass, said opening having the same cross sectional shape as the electrode and providing a very close clearance space between the electrode and the inner surface of said guide opening and which is open to the atmosphere at the point remote from said complementally formed guide block surface which seals against the entry surface of the workpiece so as to provide a limiting flow exit path for the electrolyte flowing from the work gap thus to insure that the space between the electrode working face and the entry surface of the workpiece is filled with electrolyte, and a plurality of lateral guide members adjustably held by said guide block and projecting into said opening and lightly guiding the electrode against lateral vibration.

6. In electrolytic cavity sinking apparatus of the type having means for holding a conductive workpiece, a hollow conductive electrode, means for relatively moving the workpiece and electrode toward each other, means connected to the electrode and the workpiece for impressing a low-voltage, high-density, direct current therebetween in a sense to make the workpiece anodic, and means for supplying electrolyte through the electrode under high pressure to produce a high velocity flow of electrolyte in the work gap between the workpiece and the electrode, the combination comprising, an electrode guide block made of a substantially incompressible electrically conductive, corrosion resistant material and having a guide surface adapted to lie against the entry surface of the workpiece and complementally formed therewith so as to seal thereagainst, an opening through said guide block and through which the electrode is adapted to pass, said opening having the same cross sectional shape as the electrode and providing a very close clearance space in the range of about .002 to .004 inch between the electrode and the inner surface of said guide opening, a plurality of axially offset lateral guide members adjustably held by said guide block and projecting into said opening and lightly guiding the electrode against lateral vibration, a backup cup of nonconductive, corrosion resistant material having an inwardly facing cavity lying against the exit surface of the workpiece, said cavity of said cup being aligned with said electrode guide opening, and means removably clamping said electrode guide block and said cup against the workpiece to facilitate entry of the electrode into a workpiece the entry surface of which is other than parallel to the active face of the electrode tip and to insure return of electrolyte from the electrode tip along the outer surface of the electrode, and through the hole being formed in the workpiece and said guide block opening.

7. In the method of electrolytically sinking a cavity in a conductive workpiece by advancing a hollow electrode having a conductive working face toward and into the workpiece while flowing an electrolyte through the electrode and into the work gap between the electrode working face and the workpiece under high pressure and at high velocity, and while impressing a low voltage, high density direct current between the workpiece and the electrode in a sense to make the workpiece anodic, the improvement which comprises guiding the electrode toward and into the workpiece so that one portion of the electrode working face is brought closely adjacent the entry surface of the workpiece before the remaining electrode working face portions, sealing against the entry surface of the workpiece in the area surrounding the entrance to the cavity to be formed in the workpiece to form an enclosed space between the electrode working face and the entry surface of the workpiece so as to prevent the uncontrolled escape of electrolyte from the work gap at the entry surface thereby to insure controlled electrolysis and proper entry of the electrode into the workpiece, and controlling the exit of electrolyte from the space to insure the space remains filled with electrolyte until the entirety of the electrode working face has penetrated the workpiece.

8. In the method of electrolytically sinking a cavity in a conductive workpiece by advancing a hollow electrode having a conductive working tip toward and into the workpiece while flowing an electrolyte through the electrode and into the work gap between the electrode working tip and the workpiece under high pressure and at high velocity, and while impressing a low voltage, high density direct current between the workpiece and the electrode in a sense to make the workpiece anodic, the improvement which comprises guiding the electrode toward and into the workpiece so that one portion of the electrode working tip is brought closely adjacent the entry surface of the workpiece before the remaining electrode working tip portions, sealing against the entry surface of the workpiece in the area surrounding the cavity to be formed in the workpiece to form an enclosed space between the electrode working tip and the entry surface of the workpiece so as to prevent the uncontrolled escape of electrolyte from the work gap at the entry surface thereby to insure controlled electrolysis and proper entry of the electrode into the workpiece, directing and limiting the rate of flow of the used electrolyte past the electrode tip and along the exterior surface of the electrode in a direction away from the work gap thereby to insure that the space ahead of the working tip is filled with electrolyte at least until the entirety of the working tip has penetrated the workpiece, and laterally guiding the electrode to prevent shorting contact between the electrode tip and the cavity in the workpiece.

9. In the method of electrolytically forming a hole through a conductive workpiece having non-parallel entry and exit surfaces, advancing a hollow electrode having a conductive working trip toward and through the workpiece, the electrode working tip being nonparallel to the entry surface of the workpiece so that one portion of the working tip is brought closely adjacent to the entry surface before the remaining working tip portions, flowing an electrolyte through the electrode and into the work gap between the electrode and the workpiece under high pressure and at high velocity, impressing a low-voltage, high-density, direct current between the workpiece and the electrode in a sense to make the workpiece anodic, guiding the electrode toward and into the workpiece and sealing against the entry surface of the workpiece in the area surrounding the entrance to the hole to be formed in the workpiece to form an enclosed space between the electrode working tip and the entry surface of the workpiece so as to prevent the uncontrolled escape of electrolyte from the work gap at the entry surface thereby to insure controlled electrolysis and proper entry of the electrode into the workpiece, and directing and limiting the rate of flow of the used electrolyte past the electrode tip and along the exterior surface of the electrode in a direction away from the work gap thereby to insure that the space ahead of the working tip is filled with electrolyte at least until the entirety of the working tip has penetrated the workpiece.

10. In the method of electrolytically forming a hole through a conductive workpiece having non-parallel entry and exit surfaces, advancing a hollow electrode having a conductive working tip toward and through the workpiece, the electrode working tip having a face parallel to the exit surface of the workpiece and nonparallel to the entry surface so that one portion of the working tip face is brought closely adjacent the entry surface before the remaining working tip face portions, flowing an electrolyte through the electrode and into the work gap between the electrode and the workpiece under high pressure and at high velocity, impressing a low-voltage, high-density, direct current between the workpiece and the electrode in a sense to make the workpiece anodic, guiding the electrode toward and into the workpiece and sealing against the area on the entry surface of the workpiece in the area of the hole to be formed in the workpiece to form an enclosed space between the electrode working tip and the entry surface of the workpiece so as to prevent the uncontrolled escape of electrolyte from the work gap at the entry surface thereby to insure controlled electrolysis and proper entry of the electrode into the workpiece, receiving any workpiece slug from the hole at the exit surface and removing the slug from the vicinity of the workpiece before passing the electrode tip past the exit surface, and at all times directing and limiting the rate of flow of the used electrolyte back past the electrode tip and along the exterior surface of the electrode in a direction away from the work gap thereby to insure that the space ahead of the working tip is filled with electrolyte at least until the entirety of the working tip has penetrated the workpiece.

References Cited by the Examiner

UNITED STATES PATENTS

| | | | |
|---|---|---|---|
| 35,099 | 4/62 | Temley | 77—62 |
| 1,308,630 | 7/19 | Hatch | 248—124 |
| 1,320,208 | 10/19 | Curtis | 77—62 |
| 1,915,847 | 6/33 | Brant | 77—62 |
| 2,899,781 | 8/59 | Williams | 204—143 |

FOREIGN PATENTS 335,003  9/30  Great Britain.

JOHN H. MACK, *Primary Examiner.*

JOHN R. SPECK, *Examiner.*

Dedication 3,196,093.—*Lynn A. Williams*, Winnetka, Ill. ELECTROLYTIC CAVITY SINKING APPARATUS AND METHOD FOR NON-PARALLEL WORKPIECE SURFACES. Patent dated July 20, 1965. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]